Feb. 7, 1939.   R. G. AREY   2,146,555
HOOK-ON MEASUREMENT DEVICE
Filed June 14, 1938
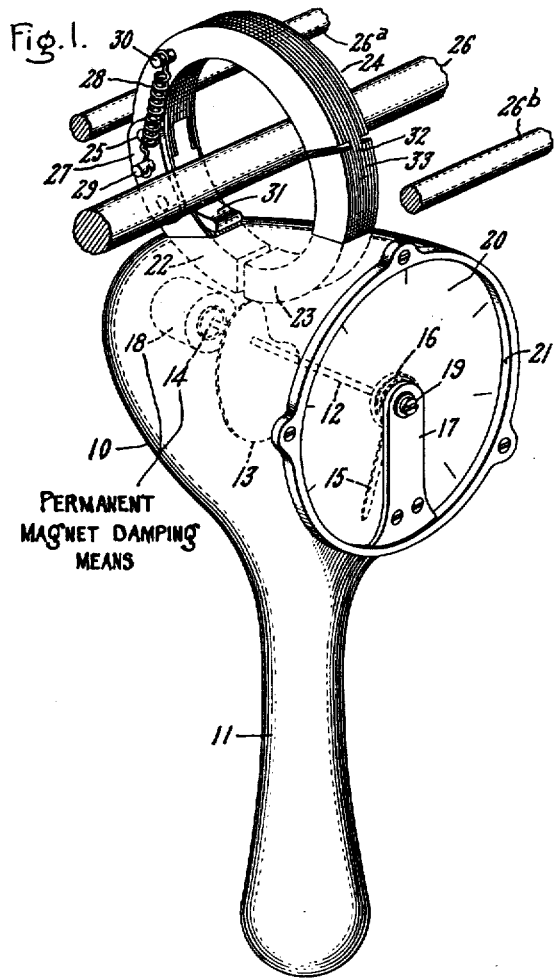
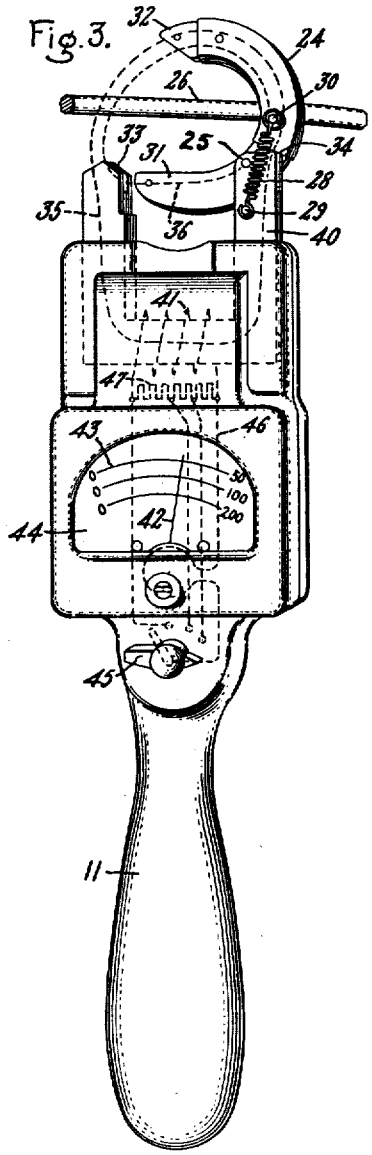
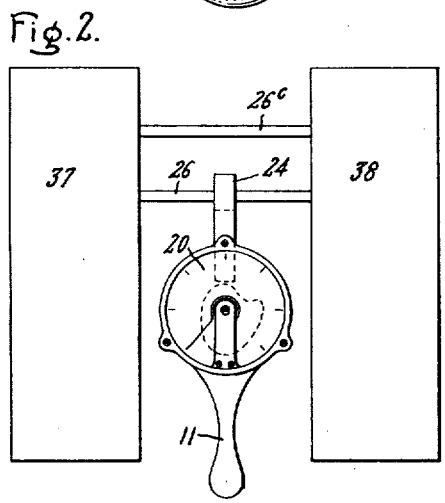
Inventor:
Ralph G. Arey,
by Harry E. Dunham
His Attorney.

Patented Feb. 7, 1939

2,146,555

UNITED STATES PATENT OFFICE 2,146,555

HOOK-ON MEASUREMENT DEVICE

Ralph G. Arey, Swampscott, Mass., assignor to General Electric Company, a corporation of New York Application June 14, 1938, Serial No. 213,658

5 Claims. (Cl. 171—95)

My invention relates to current measuring apparatus which employs a split core to enable the core to be connected in measuring relation with a cable without cutting or otherwise disturbing the cable. This split core may also comprise the magnetic circuit of an electrical measuring instrument in which case the device is suitable for measuring either direct or alternating current. Another feature of the invention concerns a spring toggle feature associated with a C-shaped hinged part of the core whereby the core may be opened and closed by simply pulling or pushing it against the primary cable. This eliminates the necessity of a separate lever or trigger for this purpose and promotes the safety and convenience of the device. Other features and advantages will be mentioned in the detailed description to follow.

The features of my invention which are believed to be novel and patentable will be pointed out in the claims appended hereto. For a better understanding of my invention reference is made in the following description to the accompanying drawing in which Fig. 1 shows a perspective view of a measuring device having a split core which also comprises the magnetic circuit of a long scale measuring instrument. This device may be used to measure either direct or alternating current. Fig. 2 indicates the convenience of the instrument of Fig. 1 in making measurements in confined spaces; and Fig. 3 represents my improved split core arrangement applied to a multiple range transformer instrument with which it is combined.

Referring to Fig. 1, 10 represents a suitable housing and supporting structure that may be made primarily of insulating material. It has a downwardly projecting handle 11 of the same material. Within the housing 10 is a magnetic vane type of electric measuring instrument comprising a shaft 12 on which is mounted the magnetic armature vane 13, a cylindrical permanent magnet 14 and a pointer 15. A spiral spring 16 connected between the shaft 12 and the stationary bearing support 17 serves to bias the pointer to the zero indicating position shown. The cylindrical permanent magnet 14 may be made of a magnetic sintered oxide and polarized across a diameter thereof. It is surrounded by a stationary hollow cylinder 18 of conducting material such as copper. The parts 14 and 18 comprise a magnetic damper for the instrument shaft. The shaft 12 is supported in suitable bearings, one of which is seen at 19. The pointer 15 cooperates with a scale behind a transparent front cover 20 secured in place on a side wall of the housing 10 by the supporting flange 21.

The stationary field poles of the instrument are shown at 22 and 23, these pole pieces being separated by an air gap in which the armature 13 may move. The armature is of sector shape so that as the flux between the pole pieces is increased, the armature is drawn farther into the air gap and this turns shaft 12 against the bias of return spring 16, rotating pointer 15 clockwise in an up-scale direction.

The pole pieces 22 and 23 comprise a part of a magnetic circuit or loop which is a circular magnetic core having a movable upper C-shaped part 24 hinged at 25. This hinged part 24 is substantially similar to the part 24 of Fig. 3 and may be opened upward away from the casing as shown in the latter figure in order that it may be closed over a cable 26 without cutting or otherwise disturbing the cable. The core parts comprising pole pieces 22 and 23 are firmly secured in the housing 10 and extend from the interior to the top exterior of the housing as shown. These parts may, for example, be partially or wholly secured in place by moulding them into the insulation material of housing 10. The core parts are included in the magnetic circuit of the instrument and the cable 26 becomes a single turn energizing winding for such instrument.

The core is made of laminated magnetic material and serves the double purpose of a split or hook-on loop core and as the magnetic circuit of the measuring instrument. The C-shaped hinged part 24 is hinged between upwardly extending outer laminations 27 of pole pieces 22, and there is a spring 28 tensioned between posts 29 and 30 on the stationary and movable parts of the core, as shown. This spring is so positioned with respect to the pivot point 25 of the hinge that it acts as a toggle mechanism when the core is opened and closed. The spring thus holds the core open when it is opened, Fig. 3, and holds it tightly closed when it is closed, Fig. 1. These hinged and toggle parts of the cores of Figs. 1 and 3 are substantially alike and function in the same manner, and hence have been referred to by similar reference characters. Fig. 1 shows the hinged part closed and Fig. 3 shows it open, the toggle spring being shown on the near side in each case for illustration purposes. Usually a spring on only one side of the hinge will suffice. The stationary limb parts of the magnetic loop which extend upward from the casing are substantially of equal length.

The upper part of pole piece 22 is forked and a curved magnetic tongue part 31 of the hinged part 24 extends therein when the core is closed. When the core is open, part 31 moves upwardly and inwardly into the general position shown in Fig. 3. It will now be seen that the core (Fig. 1) may be opened by merely pulling down on handle 11, the inner contour of part 24 being pulled against cable 26, and that the core may be closed by merely pushing up on handle 11 (Fig. 3), the inner contour of part 31 being pushed against the cable 26, the pull or push in each case being sufficient to rotate the point 30 of the hinged part of the core past dead center with respect to pivot 25 and point 29 on the stationary part of the core. The core will open or close the remaining distance by spring 28.

This arrangement makes it unnecessary to provide a separate operating lever or mechanism extending downward adjacent a handle 11 for opening and closing the core. Hence, the core may be easily, adequately and permanently insulated from any part that is grasped by the hand in the use of this device and one hand is sufficient for its operation. The handle 11 is shown as being quite short but there is no reason why it may not be made several feet in length. I prefer to employ a tongue and slot connection also at the opening side of the core. Thus, I provide a tongue 32 which enters into a slot at 33 when the core is closed. This provides for a satisfactory magnetic connection at the junction points when the core is closed. When the core is open, its opening movement is limited by a suitable stop which may comprise shoulders on the adjacent parts of the hinge, as shown at 34, Fig. 3. For purposes which will be explained later, it is desirable that the open position of the core parts be definite, and this is assured by a definite stop, such as described.

In the device of Fig. 1 it will be evident that when the core is closed about a conductor 26 which carries current, a flux will be induced in the core and will cross the armature air gap and attract the armature. The armature will tend to move into the path of the flux in the air gap by an attraction force proportional to the flux and proportional to the current in cable 26. Rotation of the armature and pointer shaft is resisted by the spring 16. The pointer 15 will thus move up-scale until these forces are balanced. The measurement principle, although not necessarily the calibration, is the same with either direct or alternating current. The magnetic vane should be made of a magnetic material having high permeability and low hysteresis. A long scale, about 270 degrees, and a satisfactory scale distribution are made possible by giving a cam shape to the armature such that the armature moves into the air gap gradually as the pointer moves up-scale.

Owing to the C-shape of the hinged part 24 and the manner in which it is hinged at a point between its ends to open upward and outward, it will be seen that it occupies very little more lateral space in its open position than when closed. The advantage of this is that the core may be hooked over a conductor such as the conductor 26 when it is located fairly close to and between other conductors such as the conductors 26a and 26b, or when the conductor 26 is close to any other object. Also, the overall diameter of the conductor 26, including any insulation thereon, may be quite large since the opening of the core as shown in Fig. 3 is sufficient to accommodate substantially the largest size conductor that the core will conveniently enclose when shut.

The device of Fig. 1 has its pointer 15 rotating in a plane which is normally parallel with the axis of the conductor 26 over which the core of the device is snapped. This is important in many cases, like that represented in Fig. 2. Here 37 and 38 represent meter or switch enclosing boxes of appreciable depth with the electrical conductors such as 26 and 26c running between them. Let it be assumed that the boxes are spaced six inches apart. The instrument of Fig. 1 is represented as being hooked over the conductor 26 in order to measure the current flowing therein. Now, it is evident that if the scale 20 of the instrument had faced towards one or the other of the adjacent boxes 37 or 38, it would be extremely difficult, if not impossible for one to read the measurement indication thereon. For example, if one used the measuring device of Fig. 3 in this instance where the scale is in a plane at right angles to the normal axis of the conductor 26 and the conductor was of considerable size, the scale could not be turned to face towards the natural position of the observer but would have to face towards one of the meter boxes. Hence, it is often of considerable advantage to have the scale of the instrument in a plane at right angles to the plane of the core loop and parallel with the normal axis of the conductor being metered as in Fig. 1.

The device of Fig. 3 employs the C-shaped hinged core portion with its toggle snap action as in Fig. 1 and hence has the desirable features of a wide opening, is operable in a limited space with one hand without the necessity of any extra lever for operating the hinged part to open and closed position. The lower stationary part 40 of the core is a laminated U-shaped magnetic core on which is wound the secondary winding 41 of a transformer. The secondary winding and its connections are illustrated more or less schematically in dotted lines but in practice the low voltage secondary circuit will be well insulated from the core 40. Below the transformer is an electrical measuring instrument having its pointer 42 and scale 43 exposed to view behind a transparent cover 44. The secondary winding may be connected across a resistance 47 from which a number of taps lead to a tap changing switch, the operating handle of which is shown at 45. The electrical measuring instrument may be connected in circuit with the common lead 46 which goes to the movable contact of the switch. The arrangement indicated is such that various portions of the transformer winding shunt 47 may be connected across the instrument to change the measuring ratio and the instrument has different scale graduations to be used with the different tap connections and calibrated with the transformer to measure alternating current flow in a conductor 26 when the transformer core is closed about such conductor. The instrument circuit arrangement may be varied considerably and the instrument may be of the rectifier type. The present invention does not concern these details and the illustration is intended to merely indicate generally an arrangement by which the measurement ratio between transformer and instrument may be carried in order more clearly to bring out a precautionary test procedure that is made available by the position of the C-shaped hinged core part of the hook-on transformer when in the open position.

It is noted that when the core is open the opening in the C part faces the cable entrance opening and it may be made partially to encircle a current-carrying conductor 26 as illustrated in Fig. 3. The conductor is assumed to be carrying an unknown current and at this time, before the core is closed, it is not known but what the primary current is so great as to cause damage to the instrument in case the core is closed since the measurement energy is furnished through the magnetic circuit. The arrangement of the hinged part of the core in its open position makes possible a preliminary test to determine the advisability of closing the core. When the core is open the tongue part 31 thereof extends nearly across the upper pole portions of the stationary part of the core below the cable entrance opening. The current in conductor 26 produces flux in the core which can now take two parallel paths, one path being through the tongue 31 as indicated by dotted line 36 and the other path through the stationary yoke of the core as indicated by dotted line 35. By making the position of the tongue 31 definite by a definite stop 34, the air gap between the end of tongue 31 and the left hand upper pole piece of the core yoke is made definite. Hence, the division of the flux between the two paths indicated will always be in approximately a given ratio. This ratio will vary more or less with different positions of the conductor 26 in the opening of the core but if, in making this preliminary test, the conductor is always brought to approximately a certain position, for example, so as to rest against the core part 24 adjacent point 30, the division of flux between the paths 35 and 36 will be sufficiently close to a given ratio for the operator to obtain a sufficiently close estimate from a trial reading of his instrument to know if it is safe to close the core. That part of the flux which traverses the path 35 produces an instrument reading roughly proportional to the current in conductor 26 with the core open. This reading may be, for example, about one fifth of what the reading will be when the core is closed, assuming the same current in conductor 26. In Fig. 3 the leakage air gap of the shunt or leakage flux path 36 through tongue 31 has purposely been exaggerated for illustration purposes and should generally be quite small for this instrument. In an instrument like that shown in Fig. 1 where the stationary yoke of the core contains an armature air gap, the tongue 31 should be somewhat shorter as indicated, and the leakage air gap somewhat greater when the core is opened.

In either case it is seen that a preliminary or precautionary trial or test may be made to reliably guide the operator in determining whether or not he may close the core without probable damage to his measuring instrument. This precautionary test takes very little time and may be made by merely glacing at the instrument while in the act of hooking on preliminary to closing the core and is a safety precaution that will prevent damaged instruments. Such precautionary test assumes of course that the approximate ratio of instrument readings with the core open and closed has been determined in advance and the operator is familiar therewith.

In the multiple range instrument of Fig. 3 some protection of this nature is afforded by first trying the highest measurement ratio and reducing the ratio by the switch at 45 if conditions warrant. However, even here the precautionary test procedure is advisable and will at the same time direct the operator in selecting the proper measurement ratio to be used when the core is closed.

The instrument of Fig. 3 like that of Fig. 1 has a supporting housing made largely of moulded insulating material and with a single handle of insulating material extending from that part of the device most remote from the core part which is to be hooked over the conductor to be metered. In both cases, the core opens in a direction away from the handle and provides a large cable entrance opening at the most convenient place consistent with safety to the operator and a hooking on operation in an environment likely to be cramped for space. The hooking on operation is accomplished mostly by an endwise movement of the device away from the operator and the removal of the device from test position is mostly an endwise movement of the device towards the operator. Little lateral movement of the device is required in such operations. One hand of the operator is left entirely free to support himself on a ladder or the like while making the measurement.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. A measuring device comprising a casing, an electrical measuring instrument in said casing, a handle extending from the lower portion of said casing, a magnetic circuit including magnetic core material supported by said casing and forming a magnetic loop extending above said casing, the upper part of said loop being C-shaped and hinged so as to open upward and close downward with respect to the other part for the purpose of linking said magnetic circuit over a current-carrying conductor, said C-shaped part being pivoted intermediate its ends such that as its upper part swings outward and upward to provide a cable opening, its lower part swings inward and upward partially across between the lower limbs of the loop below the cable opening, and a resilient toggle mechanism operated by such opening and closing action, which toggle serves to hold the C-shaped part in its open or closed positions when moved to such positions.

2. Measuring apparatus comprising a casing of insulating material having a handle extending from one side thereof, a magnetic circuit comprising magnetic core material in the general shape of a loop supported by said casing and extending from the interior to the exterior of said casing in a direction opposite to said handle, that portion of the loop extending exterior to said casing comprising a pair of limbs closed by a C-shaped core part which is pivoted to one limb so that the loop may be opened to provide a cable opening in the loop, said C-shaped part being pivoted intermediate its ends to open in a direction away from the casing such that when the loop is opened the opening in the C faces the cable opening of the loop and such that when the C part embraces a cable the loop may be closed and opened by reason of forcing the inner contour of said C part against such cable by pushing and pulling on said handle respectively, and a toggle mechanism for causing a snap action opening and closing of said loop.

3. An electric measuring device comprising a casing of insulating material, a handle extending from the lower portion of such casing, a magnetic circuit including a substantially link-shaped core of magnetic material supported by said casing and extending from the interior to the exterior top side of said casing, that portion extending to the exterior of said casing comprising a pair of limb portions of approximately equal length secured in fixed relation to said casing and a C-shaped portion which serves to complete the loop exterior of said casing, said C-shaped portion being pivoted intermediate its ends to one limb portion so as to swing outwardly to provide a cable opening in the loop, a stop to limit the extent of opening movement of said C portion, a spring tensioned between the C portion and its supporting limb adjacent the pivot point to serve as a toggle to cause a snap action opening and closing of said link and to maintain the C portion in its open and closed positions when moved thereto, the lower end of the C portion forming a substantial leakage flux path between the outer ends of the limb portions of said core only when the link is opened, and means within the casing for obtaining measurements proportional to the flux in the magnetic circuit entering said casing.

4. A measuring device comprising a casing and a handle therefore made primarily of insulating material, an electrical measuring instrument within said casing, said instrument having a shaft supporting a magnetic vane armature and a pointer, a scale with which said pointer cooperates, a transparent side wall for said casing for exposing the pointer and scale, a magnetic circuit for said instrument comprising magnetic core material substantially in the shape of a circle extending from the interior to the exterior of said casing opposite said handle, in a plane at right angles to the plane of the instrument scale, said core material having an air gap for said vane armature within said casing and a C-shaped hinged portion exterior of said casing by means of which the magnetic circuit may be opened, a current carrying conductor introduced through such opening and the opening closed to interlink such conductor as a winding conductor for said magnetic circuit, said C-shaped hinged portion being pivoted intermediate its ends, a stop for limiting the opening movement of said hinged part, and a toggle for causing snap action opening and closing of said core.

5. A measuring device comprising a casing made primarily of insulating material, a handle of the same material extending from one side of said casing, an electrical measuring instrument within the casing having cooperating scale and pointer exposed to view from one side of said casing, a magnetic circuit through which the measurement energy for said electrical measuring instrument is furnished said circuit including magnetic core material of the general shape of a closed loop lying in a plane at right angles to the plane of said instrument scale and supported by said casing and extending from the interior to the exterior of said casing on a side opposite said handle, the core material exterior of said casing having a hinged portion by means of which the loop may be opened for the purpose of closing it over a current carrying cable to be metered, said hinged portion being arranged for movement to open and closed positions by respectively thrusting and pulling such hinged part against such cable.

RALPH G. AREY.

CERTIFICATE OF CORRECTION.

Patent No. 2,146,555.            February 7, 1939.

RALPH G. AREY.

It is hereby certified that error appears in the printed specification of the above numbered patent requiring correction as follows: Page 2, second column, line 70, for the word "carried" read varied; page 3, first column, line 61, for "glacing" read glancing; and that the said Letters Patent should be read with this correction therein that the same may conform to the record of the case in the Patent Office.

Signed and sealed this 28th day of March, A. D. 1939.

Henry Van Arsdale.

(Seal)                          Acting Commissioner of Patents.

3. An electric measuring device comprising a casing of insulating material, a handle extending from the lower portion of such casing, a magnetic circuit including a substantially link-shaped core of magnetic material supported by said casing and extending from the interior to the exterior top side of said casing, that portion extending to the exterior of said casing comprising a pair of limb portions of approximately equal length secured in fixed relation to said casing and a C-shaped portion which serves to complete the loop exterior of said casing, said C-shaped portion being pivoted intermediate its ends to one limb portion so as to swing outwardly to provide a cable opening in the loop, a stop to limit the extent of opening movement of said C portion, a spring tensioned between the C portion and its supporting limb adjacent the pivot point to serve as a toggle to cause a snap action opening and closing of said link and to maintain the C portion in its open and closed positions when moved thereto, the lower end of the C portion forming a substantial leakage flux path between the outer ends of the limb portions of said core only when the link is opened, and means within the casing for obtaining measurements proportional to the flux in the magnetic circuit entering said casing.

4. A measuring device comprising a casing and a handle therefore made primarily of insulating material, an electrical measuring instrument within said casing, said instrument having a shaft supporting a magnetic vane armature and a pointer, a scale with which said pointer cooperates, a transparent side wall for said casing for exposing the pointer and scale, a magnetic circuit for said instrument comprising magnetic core material substantially in the shape of a circle extending from the interior to the exterior of said casing opposite said handle, in a plane at right angles to the plane of the instrument scale, said core material having an air gap for said vane armature within said casing and a C-shaped hinged portion exterior of said casing by means of which the magnetic circuit may be opened, a current carrying conductor introduced through such opening and the opening closed to interlink such conductor as a winding conductor for said magnetic circuit, said C-shaped hinged portion being pivoted intermediate its ends, a stop for limiting the opening movement of said hinged part, and a toggle for causing snap action opening and closing of said core.

5. A measuring device comprising a casing made primarily of insulating material, a handle of the same material extending from one side of said casing, an electrical measuring instrument within the casing having cooperating scale and pointer exposed to view from one side of said casing, a magnetic circuit through which the measurement energy for said electrical measuring instrument is furnished said circuit including magnetic core material of the general shape of a closed loop lying in a plane at right angles to the plane of said instrument scale and supported by said casing and extending from the interior to the exterior of said casing on a side opposite said handle, the core material exterior of said casing having a hinged portion by means of which the loop may be opened for the purpose of closing it over a current carrying cable to be metered, said hinged portion being arranged for movement to open and closed positions by respectively thrusting and pulling such hinged part against such cable.

RALPH G. AREY.

CERTIFICATE OF CORRECTION.

Patent No. 2,146,555.     February 7, 1939.

RALPH G. AREY.

It is hereby certified that error appears in the printed specification of the above numbered patent requiring correction as follows: Page 2, second column, line 70, for the word "carried" read varied; page 3, first column, line 61, for "glacing" read glancing; and that the said Letters Patent should be read with this correction therein that the same may conform to the record of the case in the Patent Office.

Signed and sealed this 28th day of March, A. D. 1939.

Henry Van Arsdale.

(Seal)                 Acting Commissioner of Patents.